A. P. SOUTHWICK,

Assignor, by mesne assignments, to E. STERN.

Manufacture of Illuminating Gas.

No. 8,567. Reissued Feb. 4, 1879.

Witnesses:

Geo. W. Miatt

Anthony Greff Jr.

Inventor

A. P. Southwick

By his Attorney

E. N. Dickerson Jr.

N. PETERS, PHOTO-LITHOGRAPHER, WASHINGTON, D. C.

UNITED STATES PATENT OFFICE

ALFRED P. SOUTHWICK, OF BUFFALO, NEW YORK, ASSIGNOR, BY MESNE ASSIGNMENTS, TO EDWARD STERN, OF NEW YORK CITY.

IMPROVEMENT IN THE MANUFACTURE OF ILLUMINATING-GAS.

Specification forming part of Letters Patent No. 142,289, dated August 26, 1873; Reissue No. 8,567, dated February 4, 1879; application filed January 2, 1879.

*To all whom it may concern:*

Be it known that I, ALFRED P. SOUTHWICK, of the city of Buffalo, in the county of Erie and State of New York, have invented certain new and useful Improvements in the Manufacture of Illuminating-Gas; and I do hereby declare the following to be a full, clear, and exact description of the same, reference being had to the accompanying drawings, making part of this specification, in which—

Figure 1:
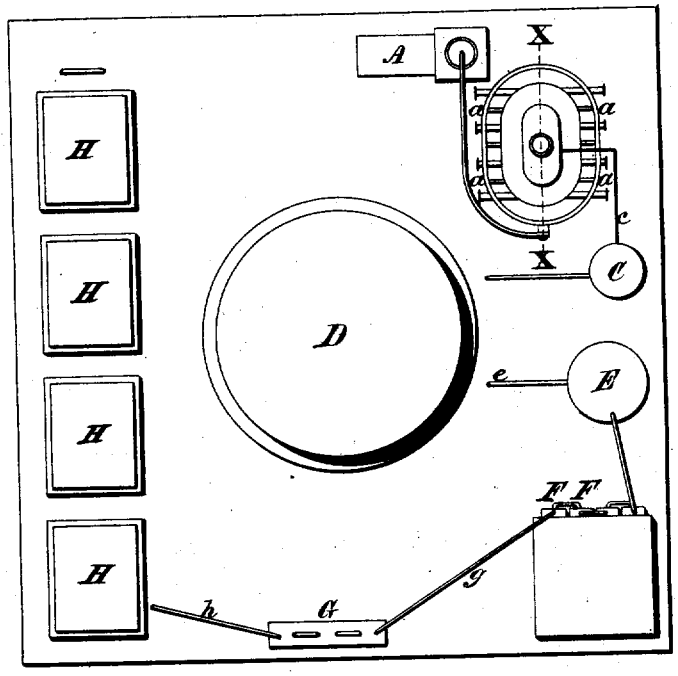
Figure 2:
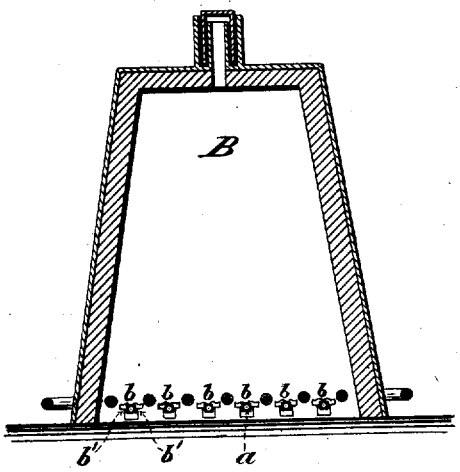
Figure 2:
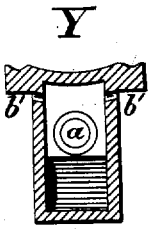

Figure 1 is a plan view of the entire apparatus. Fig. 2 is a vertical longitudinal section through the decomposing-cupola on line X X, Fig. 1. Y shows an enlarged view of the grate-bar.

The object of my invention is to produce a better apparatus and process for the production of illuminating-gas enriched by hydrocarbon than has before been possible, and to obtain a greater regularity and certainty in the illuminating power; and it consists in an improved process for the manufacture of carbureted water-gas by alternately passing superheated steam and air through incandescent carbon contained in the decomposing-cupola, the gas made from the former being conducted into a governing-holder, from which it is forced through a carbureting-vessel and fixing-retorts, and finally through purifiers charged with hydrate of lime.

The improvement in apparatus for the manufacture of illuminating-gas enriched by hydrocarbon consists in the introduction, between a carbureting-vessel and a source of gas, of an intermediate governing-holder, into which the gas enters before it passes through the carbureter. The object of this contrivance is to insure a regular flow through the carbureter, because if different quantities of gas were passing through the carbureting-vessel at different consecutive periods of time it would follow that such successive volumes would have a varying degree of illuminating power, owing to the fact that they had taken up more or less of the enriching hydrocarbon. By interposing between a carbureter and a gas-generator an intermediate governing-holder I regulate and determine the richness of the gas which is delivered to the distributing-holder. I also employ a fixing-retort for heating or converting the gas after it has been carbureted.

It is plain that this method of regulating the carburation of gas by the use of a governing and a distributing holder and an intermediate carbureter is applicable to the poor gas originally produced, in whatever way it may have been produced. The governing-holder is useful not only in connection with the carbureter, but also with the fixing-retorts, because by having a constant flow of gas through such fixing-retorts they are maintained at nearly the same temperature at all times, while otherwise their temperature would vary very greatly.

In the manufacture of carbureted water-gas it has heretofore been considered essential to remove all of the carbonic oxide contained therein (amounting to forty per cent.) by converting it into carbonic-acid gas, and then removing the result of this conversion, (carbonic-acid gas,) which is a practical impossibility.

In view of this fact, and the additional fact that about forty per cent. of carbonic oxide in carbureted-hydrogen gas adds to the candle-light power of the gas instead of deteriorating it, the object of my invention is to generate the minimum percentage of carbonic-acid gas and the maximum percentage of inflammable gases, to retain all of the latter, including the carbonic oxide, and freeing it after carburation of all the impurities, including carbonic acid, of which there are from two to four per cent. sulphureted hydrogen, the quantity of which will vary with the quality of coal used in the decomposing-cupola, and all of the free atoms of tar carried through the washers. This I accomplish by conducting the gases, after they have been carbureted and washed, through purifiers charged with hydrate of lime.

Like letters of reference designate like parts in each of the figures.

A is a steam-boiler of ordinary construction, in which steam is generated. B is the decomposing-cupola, having one or more hollow grate-bars, *b b*, into which the steam from the boiler is conducted through pipes *a a*. *b′ b′* are small holes, through which the superheated steam passes from the superheating grate-bars into and through the body of incandescent carbon, by which it is decomposed. The oxygen in the steam, uniting with the carbon of the coal, sets the hydrogen free. C is a condenser, into which the gases are conducted from the decomposing-cupola through a pipe, *c*. D is a small gas-holder or governing-reservoir, into which the gas is conducted, and from which it passes, through a pipe, *e*, into the carbureter E, consisting of a shell or vessel containing shelves or shallow pans filled with liquid hydrocarbon. The gas, in passing over these pans, takes up and carries off the hydrocarbon vapor suspended over these pans into and through one or more hot retorts, F F, in which the gas is fixed. It is next conducted through a pipe, *g*, into and through the washer G, which is of ordinary construction. The composition of the gas is now found to be carbureted hydrogen, carbonic-acid gas, carbonic oxide, sulphureted hydrogen, free carbon or tar, and minute traces of other chemical combinations incident to all illuminating-gases. This combination of gases is now conducted through a pipe, *h*, into and through one or more purifiers, H H, charged with hydrate of lime, by which the gas is freed of all its impurities, leaving only carbureted hydrogen and carbonic oxide, both of which are inflammable, to be carried to the distributing-holder. The passage of the superheated steam through the incandescent carbon (coal) in the decomposing-cupola has the effect to deaden or extinguish the fire. It therefore becomes necessary to allow a current of atmospheric air to pass through it. This I accomplish by occasionally closing the communication between the boiler and the decomposing-cupola, and between the decomposing-cupola and the condenser, also opening a passage to the atmosphere from the upper portion of the cupola, and allowing a free flow of atmospheric air to enter beneath the grate-bars and pass up through the body of the fire. By this means the fire is again brought to the necessary intensity. During this operation the governing-holder D performs its important office of keeping up the carburation and purification of the gas contained therein, it being of sufficient weight to keep a constant flow of gas through the carbureting apparatus and the purifiers.

The ends of the hollow grate-bars *b* are cast only partially closed, steam being admitted thereto through the upper half, the lower half being stopped off, so as to form a trough, wherein the water formed by the condensation of steam can accumulate and be vaporized.

I am aware of the English patent granted to John Constable in 1845, and numbered 10,690. I do not claim anything there shown.

What I claim as my invention, and desire to secure by Letters Patent, is—

1. The combination of the steam-boiler A, decomposing-cupola B, governing-holder D, carbureting apparatus E F F, and the purifiers H H, all being arranged substantially as described, and for the purpose set forth.

2. The process herein described for making carbureted-water gas by alternately passing confined currents of superheated steam and free currents of atmospheric air through incandescent carbon contained in the decomposing-cupola, the gas made from the steam alone being conducted into a governing-holder, from which it is forced through a vessel containing liquid hydrocarbon at a low temperature to be carbureted, and through one or more highly-heated retorts, in which it is fixed, and finally through one or more purifiers charged with hydrate of lime, by which the gas is freed of all its impurities.

3. The combination, in an apparatus for producing enriched gas, of a source of gas, or gas-generator, a governing-holder, into which the gas flows from the gas-generator, a carbureter or enricher, into which the gas flows from the governing-holder, and a distributing-holder, into which the gas passes from the carbureter or enricher, substantially as described.

4. The combination, in an apparatus for producing gas, of a source of gas, or gas-generator, a governing-holder, into which the gas flows from the gas-generator, a fixing-retort, into which the gas flows from the governing-holder, and a distributing-holder, into which the gas passes from the fixing-retort, substantially as described.

5. The combination, in an apparatus for producing enriched gas, of a source of gas, or gas-generator, a governing-holder, into which the gas flows from the gas-generator, a carbureter or enricher, into which the gas flows from the governing-holder, a fixing-retort, into which the gas passes from the carbureter, and a distributing-holder, into which the gas passes from the fixing-retort, substantially as described.

6. The combination, in an apparatus for producing enriched gas, of a source of gas, or gas-generator, a governing-holder, into which the gas flows from the gas-generator, a carbureter or enricher, into which the gas flows from the gas-holder, a purifying apparatus, and a distributing-holder, into which the gas passes before it is distributed to the public, substantially as described.

7. The combination, in an apparatus for producing enriched gas, of a source of gas, or gas-generator, a governing-holder, into which the gas flows from the gas-generator, a carbureter or enricher, into which the gas flows from the governing-holder, a fixing-retort, into which the gas passes from the carbureter, a gas-purifier, and a distributing-holder, into which the gas is received before it is distributed to the public, substantially as described.

8. The process of manufacturing enriched gas, which consists in passing a regulated and controlled quantity, of even flow, through a carbureter and fixing apparatus, and subsequently into a distributing-holder, as distinguished from the process of producing gas which consists in sending an irregular or intermittent flow through a carbureter and fixing-retort before it passes into a distributing-holder, substantially as described.

9. The combination, in an apparatus for producing enriched gas, of a source of gas, a governing-holder, a carbureter, and a distributing-holder, the governing-holder being connected with the supply of gas between the source of gas and the carbureter, for the purpose of receiving any excess of gas, and of maintaining an even flow through the carbureter, thereby avoiding the variation in flow due to the varying production of gas at different periods, substantially as described.

ALFRED P. SOUTHWICK.

In presence of—
ROBERT POMEROY,
GEORGE W. CARROLL.